(12) United States Patent
Ito et al.

(10) Patent No.: US 7,717,211 B2
(45) Date of Patent: May 18, 2010

(54) SWING ARM STRUCTURE WITH SHAFT DRIVE AND SPACER

(75) Inventors: Shinji Ito, Saitama (JP); Kenji Kofuji, Saitama (JP); Masatsugu Nishimura, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 323 days.

(21) Appl. No.: 11/699,479

(22) Filed: Jan. 30, 2007

(65) Prior Publication Data

US 2007/0193806 A1 Aug. 23, 2007

(30) Foreign Application Priority Data

Jan. 31, 2006 (JP) .............................. 2006-023927

(51) Int. Cl.
*B62M 17/00* (2006.01)
*B62K 25/02* (2006.01)

(52) U.S. Cl. ....................................... 180/226; 180/227

(58) Field of Classification Search ................ 180/226, 180/227, 383, 219, 385; 280/284, 288, 285, 280/286, 288.4; 301/6.9, 8, 120, 124.2, 125
See application file for complete search history.

(56) References Cited

U.S. PATENT DOCUMENTS

| | | | | |
|---|---|---|---|---|
| 2,156,412 A * | 5/1939 | Tingle | ......................... | 180/226 |
| 3,318,408 A * | 5/1967 | Hopkins | ..................... | 180/230 |
| 4,664,215 A * | 5/1987 | Suzuki et al. | ................ | 180/226 |
| 4,805,941 A * | 2/1989 | Downing et al. | ............. | 280/279 |
| 5,058,913 A * | 10/1991 | La Riviere et al. | ........ | 280/281.1 |
| 5,215,324 A * | 6/1993 | Kawai | ......................... | 280/279 |
| 5,240,087 A * | 8/1993 | Parker | ......................... | 180/231 |
| 5,918,695 A * | 7/1999 | Matsuura et al. | ............. | 180/226 |
| 5,992,587 A * | 11/1999 | Maldonado | .................. | 188/344 |
| 6,516,912 B2 * | 2/2003 | Iwai et al. | .................... | 180/226 |
| 6,926,297 B2 * | 8/2005 | Czysz | ......................... | 280/276 |
| 7,040,640 B2 * | 5/2006 | Conte | ......................... | 280/284 |
| 7,311,168 B2 * | 12/2007 | Kofuji | ......................... | 180/227 |
| 2004/0238298 A1 * | 12/2004 | Nash | .......................... | 188/152 |
| 2005/0168055 A1 * | 8/2005 | Conte | ..................... | 301/64.201 |
| 2006/0257202 A1 * | 11/2006 | Bexten et al. | .................. | 403/1 |

FOREIGN PATENT DOCUMENTS

| | | | | |
|---|---|---|---|---|
| GB | 2214881 | A | * | 9/1989 |
| JP | 02085083 | A | * | 3/1990 |
| JP | 9-24881 | A | | 1/1997 |
| JP | 3162322 | B2 | | 2/2001 |

* cited by examiner

*Primary Examiner*—Lesley Morris
*Assistant Examiner*—Wesley Potter
(74) *Attorney, Agent, or Firm*—Birch, Stewart, Kolasch & Birch, LLP

(57) ABSTRACT

To provide a rear wheel structure which can easily perform the mounting and dismounting of a rear wheel without causing a fluctuation in a banking angle. In the rear wheel structure which includes a pair of left and right swing arms which are arranged to sandwich a rear wheel, a driving force transmission device is provided for transmitting a driving force to the rear wheel along one swing arm, and a spacer which is arranged on an axle of the rear wheel. A muffler is arranged outside the swing arm on a side opposite to the driving force transmission device. The spacer is arranged between the swing arm on the driving-force-transmission-device-side and the rear wheel for mounting the rear wheel relative to the one swing arm.

20 Claims, 6 Drawing Sheets

SWING ARM STRUCTURE WITH SHAFT DRIVE AND SPACER

CROSS-REFERENCE TO RELATED APPLICATIONS

The present application claims priority under 35 USC 119 to Japanese Patent Application No. 2006-023927 filed on Jan. 31, 2006 the entire contents of which are hereby incorporated by reference.

BACKGROUND OF THE INVENTION

1. Field of the Invention

The present invention relates to the rear wheel structure for a motorcycle. More particular, to a rear wheel structure which is suitable for detachably mounting a rear wheel of a shaft-drive-type motorcycle.

2. Description of Background Art

In a conventional rear wheel structure that is known, the rear wheel structure includes a spacer that is provided coaxially with a support shaft of a rear wheel, a rear wheel hub is shifted toward one side by removing the spacer and, thereafter, the rear wheel hub is removed from an arm. See, for example, Japanese Patent No. 3162322.

However, the rear wheel structure disclosed in Japanese Patent No. 3162322 has the following drawback. When a muffler is arranged on the same side as a spacer in the widthwise direction, the arm offsets outwardly in the widthwise direction by an amount corresponding to a width size of the spacer. Accordingly, the muffler is shifted outwardly and is arranged at the shifted position. Thus, a possibility exists wherein a banking angle becomes shallow.

SUMMARY AND OBJECTS OF THE INVENTION

Accordingly, it is an object of the present invention to overcome the above-mentioned drawbacks and to provide a rear wheel structure which can easily perform the detachable mounting of a rear wheel without causing a fluctuation in the banking angle.

To achieve the above-mentioned object, an embodiment of the present invention is directed to the rear wheel structure which includes a pair of left and right swing arms arranged to sandwich a rear wheel, a driving force transmission device for transmitting a driving force to the rear wheel along one swing arm, and a spacer arranged on an axle of the rear wheel. A muffler is arranged outside the swing arm on a side opposite to the driving force transmission device wherein the spacer is arranged between the swing arm on the driving-force-transmission-device-side and the rear wheel.

An embodiment of the present invention provides a rear wheel structure that includes a connection member which crosses the spacer and connects the swing arm and a casing which covers a final drive unit of the driving force transmission device. The spacer is arranged between the swing arm and the final drive unit with the swing arm and the spacer being fastened together to the casing by the connection member.

An embodiment of the present invention provides a guide member which guides the spacer that is integrally formed with the swing arm.

An embodiment of the present invention provides the driving force transmission device which is a shaft drive device that uses a drive shaft, and the drive shaft mounts a universal joint on a front portion thereof and a spherical spline on a rear portion thereof.

In an embodiment of the present invention, the spacer is arranged between the swing arm on a driving-force-transmission-device side and the rear wheel. Thus, the spacer is not arranged on the same side as the muffler which is arranged on a side opposite to the driving force transmission device side and outside the swing arm. Accordingly, a projection in the widthwise direction of the muffler-side swing arm is not increased. Further, by suppressing the projection in the widthwise direction of the muffler, as a result, the narrowing of a banking angle can be prevented. Thus, it is possible to ensure a predetermined angle.

According to an embodiment of the present invention, the rear wheel structure includes a connection member that crosses the spacer and is connected to the swing arm and the casing which covers a final drive unit of the driving force transmission device. The spacer is arranged between the swing arm and the final drive unit and is fastened together with the swing arm to the casing using the connection member. Accordingly, it is possible to detachably mount the spacer while maintaining the connection between the swing arm and the casing. Thus, at the time of performing the mounting and dismounting operation of the rear wheel, it is possible to perform such an operation while holding the casing on a vehicle body thus enhancing the workability without removing the driving force transmission device.

According to an embodiment of the present invention, the spacer is guided by the guide member which is formed on the swing arm in performing the mounting and dismounting operation. Thus, it is possible to smoothly perform the mounting and dismounting operation of the spacer.

According to an embodiment of the present invention, at the time of shifting the driving force transmission device in performing the mounting and dismounting operation of the rear wheel, the drive shaft has the engine-side end thereof connected by the universal joint and has the rear-wheel-side thereof connected by the spherical spline. Thus, it is possible to easily perform the translational movement of the drive shaft in the axial direction.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Hereinafter, a preferred embodiment of the rear wheel structure according to the present invention is explained in detail in conjunction with the drawings. In the following explanation, directions of "front," "rear," "right" and "left" are assumed to be equal to the direction as viewed from a rider operating the motorcycle.

Figure 1:
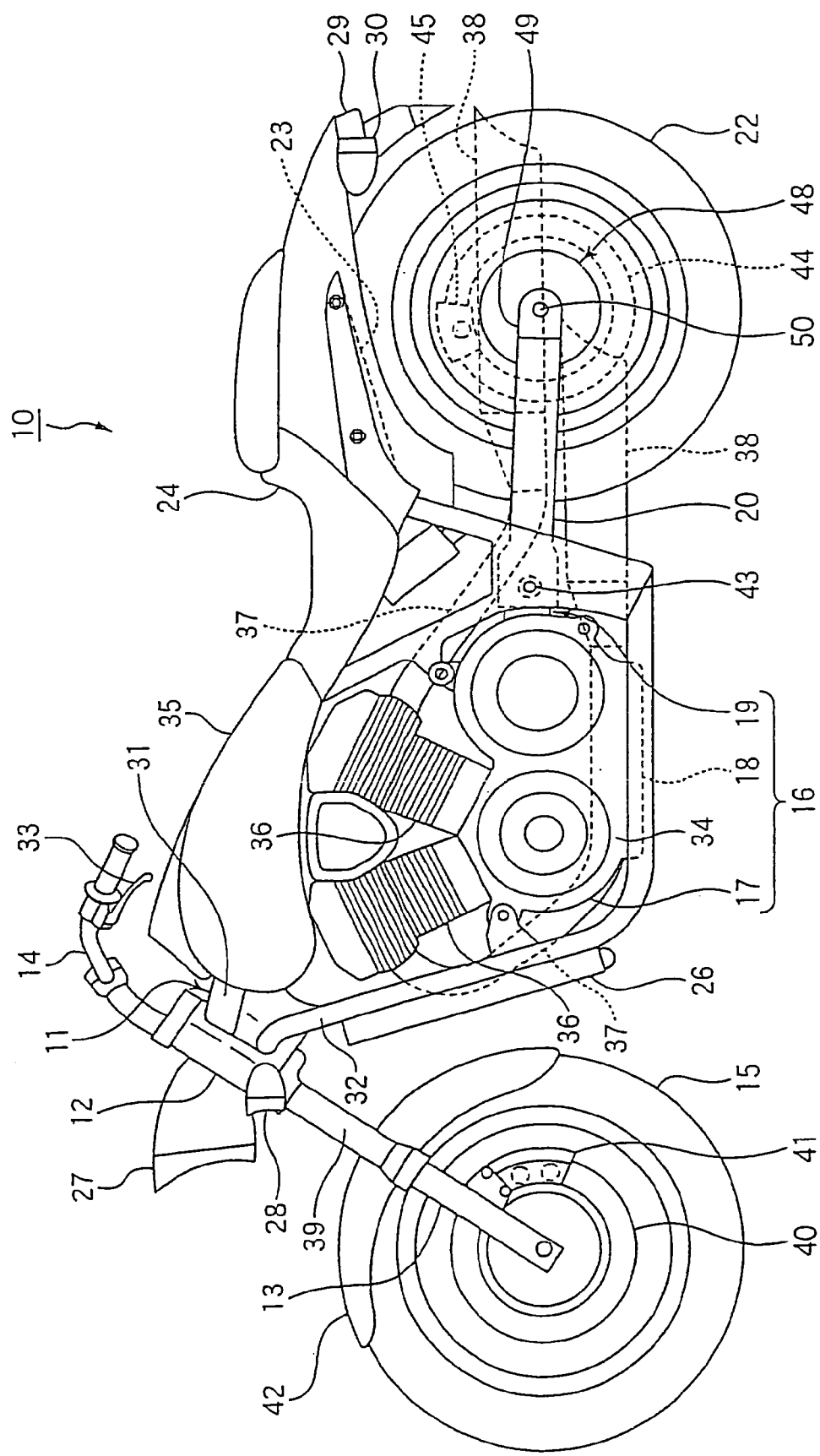
FIG. 1 is a left side view of an automobile which mounts the rear wheel structure of the present invention thereon.

As shown in FIG. 1, a motorcycle 10 includes a frame 11, a front fork 13 which is rotatably mounted on a head pipe 12 arranged on a front end portion of the frame 11, a handle 14 which is connected to an upper portion of the front fork 13 and a front wheel 15 which is rotatably mounted on a lower portion of the front fork 13. A power unit 16 includes an engine 17, a transmission 18 and a driving force transmission device 19 which are mounted on a front lower portion of the frame 11. A pair of left and right swing arms 20, 21 (the right swing arm 21 being shown in FIG. 2) are mounted on a rear lower portion of the frame 11 in a rockable manner. A rear wheel 22 is rotatably mounted on a rear end of the left and right swing arms 20, 21. A tandem seat 24 is mounted on a rear upper portion of the frame 11 by way of a seat rail 23. The motorcycle 10 is a shaft-drive-type vehicle for driving the rear wheel 22 using power transmitted by way of the drive shaft 25 and final drive unit which are incorporated in the driving force transmission device 19 of the power unit 16.

Further, the motorcycle 10 includes a radiator 26 mounted on a front lower portion of the frame 11 and a head light 27 and a pair of left and right front turn signal lamps 28 mounted on the front portion of the frame 11. Further, the motorcycle 10 includes a stop lamp 29 and a pair of left and right rear turn signal lamps 30 mounted on a rear portion thereof.

The frame 11 is, for example, formed into a substantially U-shape using a steel pipe, and the frame 11 includes a pair of left and right main frames 31 which extend rearwardly and downwardly from the head pipe 12 and a pair of left and right lower frames 32 which extend downwardly from the head pipe 12.

A front brake lever not shown in the drawing is mounted on a right side of the handle 14 in the same manner as a throttle not shown in the drawing. In addition, a clutch lever 33 is mounted on a left side of the handle 14.

In the power unit 16, the engine 17 is a V-type two-cylinder water-cooled 4-stroke OHC engine, wherein the transmission 18 is incorporated into the inside of a crankcase 34, and the engine 17 is arranged in a fixed manner to the inside of a rhomboid space which is defined between the main frame 31 and the lower frame 32 of the frame 11. On an upper portion of the power unit 16, a fuel tank 35 is mounted, and a fuel gauge and a speed meter not shown in the drawing are mounted on a front upper portion of the fuel tank 35. In the engine 17, cylinders 36 are arranged above the crankcase 34, an electronic fuel supply device not shown in the drawing is connected to intake ports of the cylinders 36 not shown in the drawing, and two exhaust pipes 37 which are connected to exhaust ports not shown in the drawing are connected to two main mufflers 38 while passing through a right lower portion and a right side portion of the engine 17.

A front suspension 39 including a coil spring and a damper is incorporated into the front fork 13 and, at the same time, a front caliper 41 which imparts a braking force to a front disk rotor 40 fixed to the front wheel 15 is assembled in the front fork 13. In addition, a front fender 42 is arranged above the front wheel 15.

The left and right swing arms 20, 21 include front ends thereof connected to a pivot shaft 43 at a rear portion of the main frame 31 in a rockable manner, and the left and right swing arms 20, 21 are buffered by a rear suspension not shown in the drawing which extends between both swing arms 20, 21 and the main frame 31 and includes a coil spring and a damper. On the rear wheel 22, a rear disc rotor 44 and a rear caliper 45 are mounted in the same manner as the front wheel 15.

Figure 2:
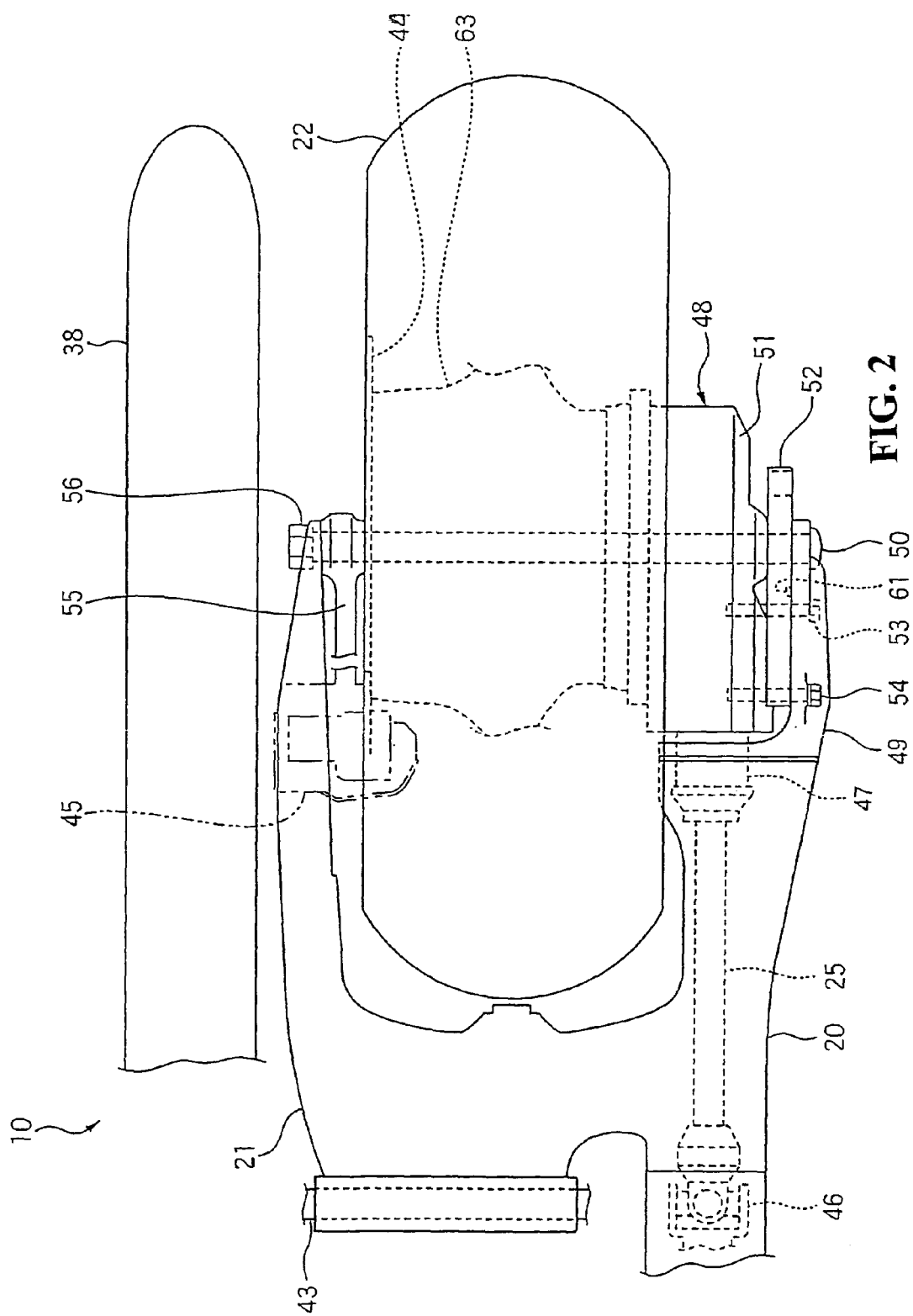
FIG. 2 is a plan view of an essential part around a rear wheel of a motorcycle shown in FIG. 1.

As shown in FIG. 2, the left and right swing arms 20, 21 have front end portions thereof integrally connected with each other. The left swing arm 20 is formed into a sleeve shape and accommodates the drive shaft 25 therein. The drive shaft 25 has a front end portion thereof connected to the transmission 18 by way of a universal joint 46 and has a rear end portion thereof connected to a final drive unit 48 by way of a spherical spline 47. Further, the left swing arm 20 integrally connects a connection member 49 to a rear end portion thereof, and a rear wheel shaft 50 is rotatably supported on the connection member 49. Further, a spacer 52 is assembled between the connection member 49 and a casing 51 of the final drive unit 48, two bolts 53 are threadedly engaged with the casing 51 through the spacer 52 in the vicinity of the rear wheel shaft 50. At a position away from the rear wheel shaft 50, two bolts 54 are threadedly engaged with the casing 51 through the spacer 52 in the same manner as the bolts 53 by fastening the connection member 49 together with the spacer 52.

The right swing arm 21 is formed into a plate shape, and a rear end portion of the right swing arm 21 rotatably supports the rear wheel shaft 50 thereon. The right swing arm 21 is assembled in a state wherein a bracket 55 of the rear caliper 45, into which the rear wheel shaft 50 is inserted, is sandwiched between the right swing arm 21 and the rear wheel 22. The bracket 55 is fixed to the right swing arm 21 by way of an engaging portion not shown in the drawing. A nut 56 is threadedly engaged with the rear wheel shaft 50 on a side where the right swing arm 21 and the main muffler 38 are arranged.

Figure 3:
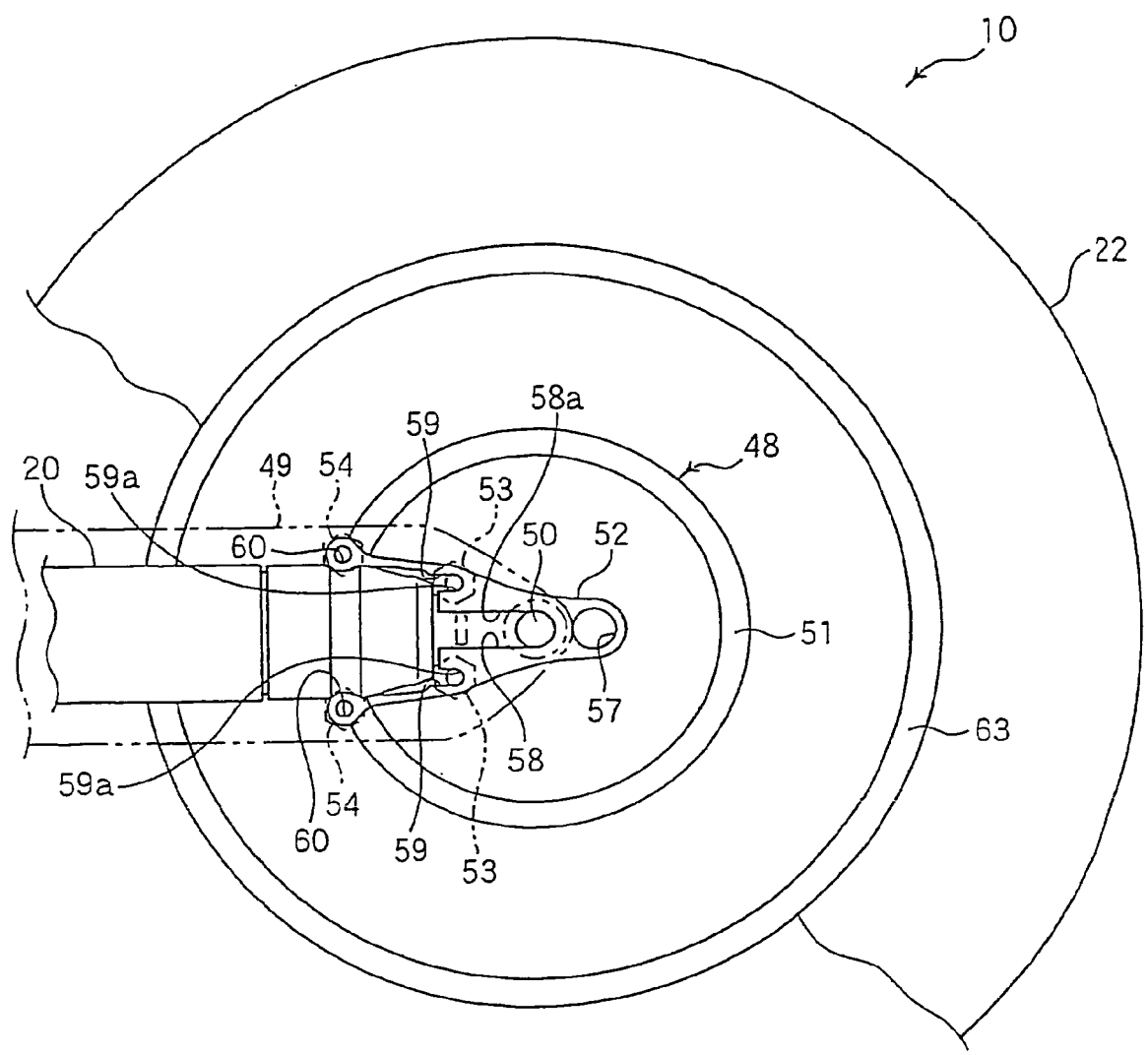
FIG. 3 is a left side view of an essential part around a spacer of the motorcycle shown in FIG. 1.

As shown in FIG. 3, the spacer 52 is formed into an approximately V-shaped plate shape by using a resilient material such as an aluminum alloy or steel. The spacer 52 forms a pull-out hole 57 for inserting a tool in a proximal end portion thereof and forms a transverse U-shaped shaft support portion 58 which is fitted on the rear wheel shaft 50 in the vicinity of the pull-out hole 57. Further, the spacer 52 forms a pair of bolt support portions 59 in a center portion thereof and a pair of bolt holes 60 in a distal end portion thereof. On a back surface, which constitutes a rear-wheel 22-side surface of the connection member 49, a guide member 61 which is formed into a rectangular projecting shape is integrally formed in a projecting manner.

Figure 6:
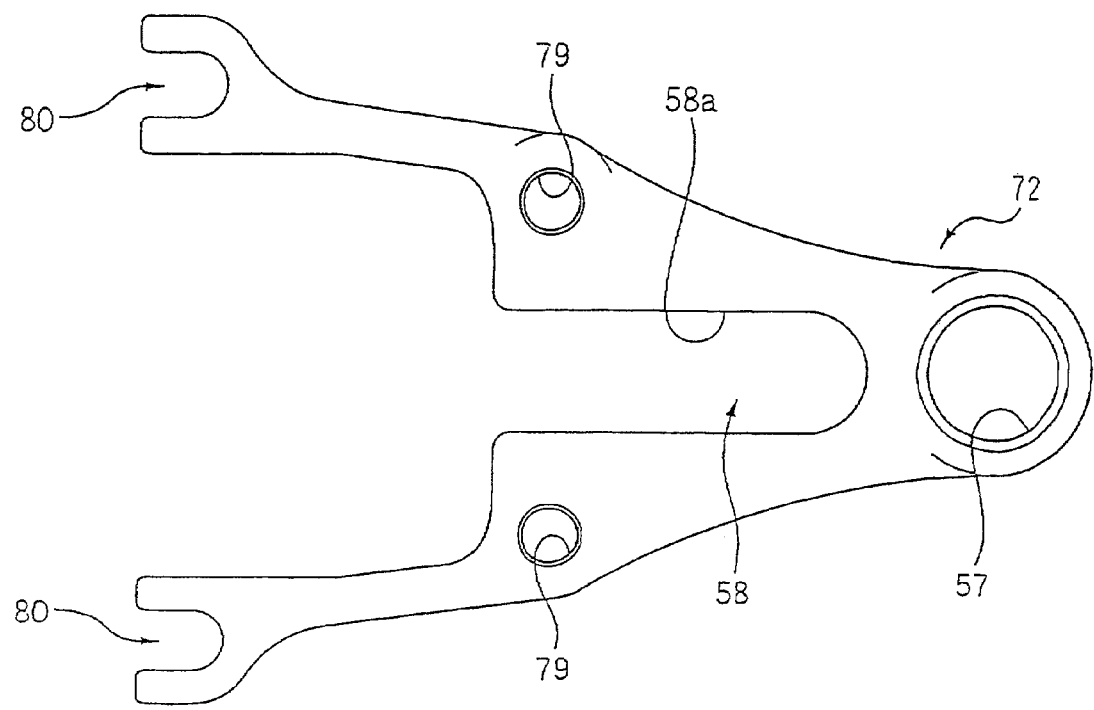
FIG. 6 is a side view showing a spacer of another mode of the present invention.

A spacer 72 of another embodiment, as shown in FIG. 6, although the pull-out hole 57 and the shaft support portion 58 are formed in the same manner as the above-mentioned spacer 52, the spacer 72 may include a pair of bolt support portions 80 on left end portions thereof and may arrange a pair of bolt holes 79 in a center portion thereof.

The spacer 52 is pulled out from the rear wheel shaft 50 before the rear wheel mounting and dismounting operation is performed, and the spacer 52 is mounted on the rear wheel shaft 50 in an inserting manner again after finishing the dismounting and mounting operation of the rear wheel. In pulling out the spacer 52 from the rear wheel shaft 50, two bolts 54 which are threaded into the casing 51 are removed from the casing 51 and, thereafter, two bolts 53 and a nut 56 are slackened. Further, a tool is inserted into a pull-out hole 57 and the tool is pulled rearwardly. Thus, the spacer 52 can be pulled out from two bolts 53 and the rear wheel shaft 50. Since notches 58a, 59a which correspond to the mounting-or-dismounting direction of the spacer 52 are formed in the pair of bolt support portions 59 and the shaft support portion 58, it is possible to pull out the spacer 52 in a state wherein the bolt 53 and the rear wheel shaft 50 are supported on the connection member 49 and the casing 51.

Opposite to the above-mentioned operation, in mounting the spacer 52 by insertion, when the tool is inserted into the pull-out hole 57 and is pushed while exteriorly mounting the shaft support portion 58 on the rear wheel shaft 50, the notch 58a of the shaft support portion 58 advances in the horizontal direction while being guided by a guide member 61. Thus, the spacer 52 is assembled at a normal position. Then, two bolts 53 are respectively threaded into the casing 51 through notches 59a formed in the pair of bolt supporting portions 59, and two bolts 54 are respectively threaded into the casing 51 through a pair of bolt holes 60 thus completing the assembling.

Figure 4:
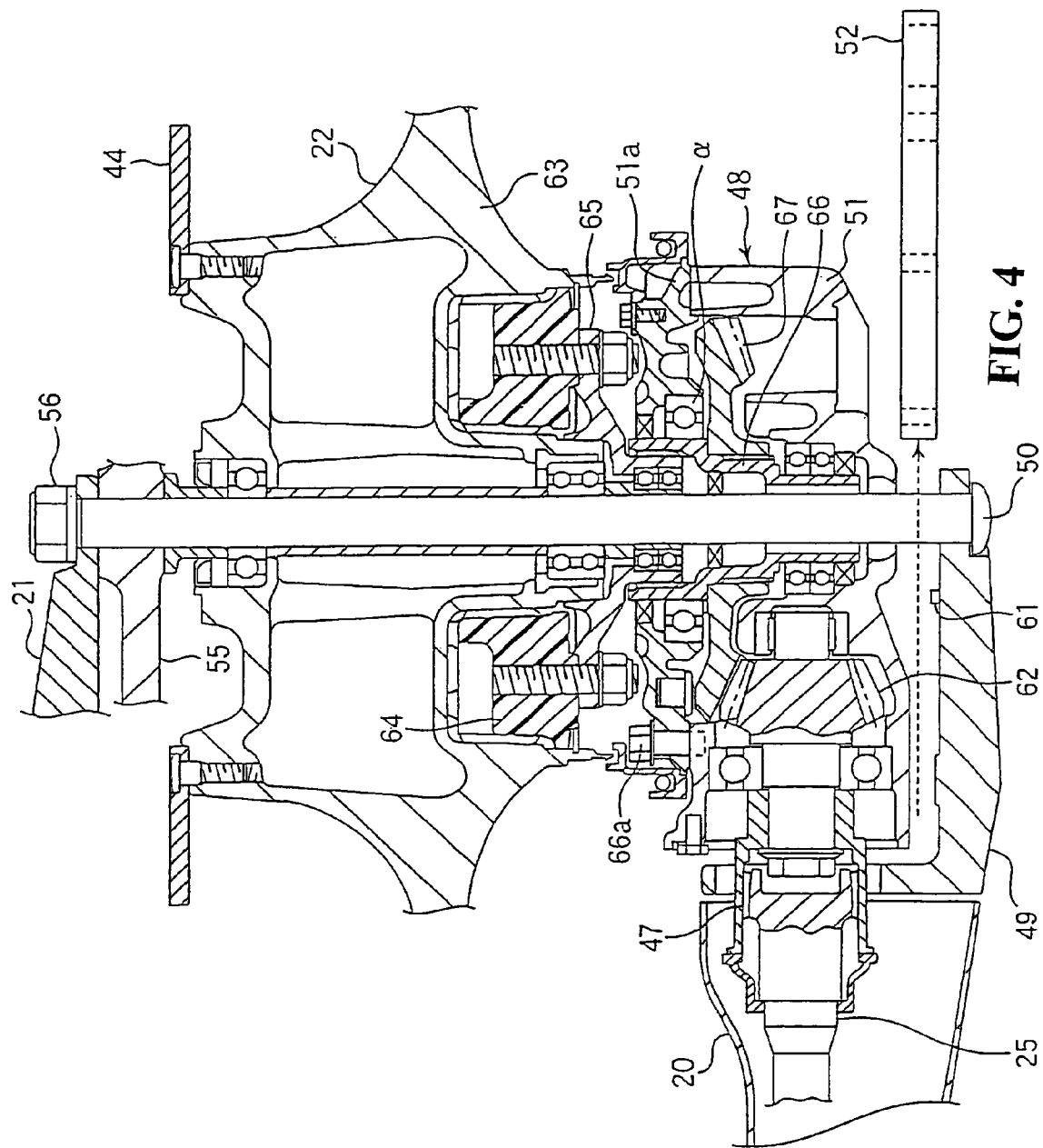
FIG. 4 is a horizontal cross-sectional view around a rear axle of the motorcycle shown in FIG. 1.

As shown in FIG. 4, the final drive unit 48 includes an input-side bevel gear 62 which is joined to the drive shaft 25 by way of a spherical spline 47 on an input side in the inside of the casing 51, a damper mechanism 64 which is fixed to a rear-wheel wheel 63, a flange 65 which is fixed to the damper mechanism 64, an inner member 66 which is inserted into the rear wheel shaft 50 and is joined to the flange 65 by spline joining, and an output-side bevel gear 67 which is fixed to the inner member 66 on an output side and inside the casing 51 and is meshed with the input-side bevel gear 62.

Figure 5:
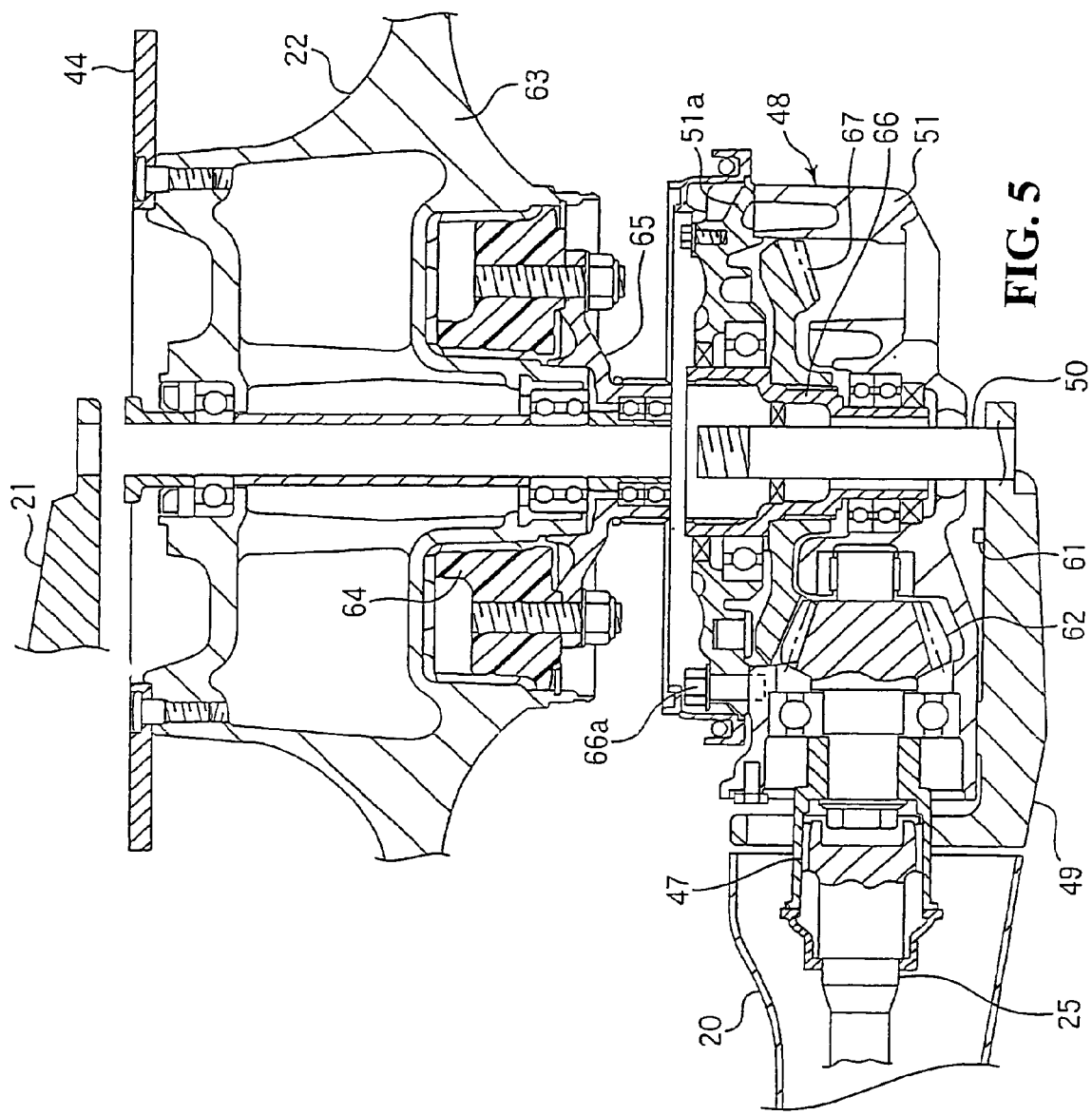
FIG. 5 is a horizontal cross-sectional view at the time of mounting or dismounting a rear wheel shown in FIG. 4.

Next, the mounting and dismounting steps of the rear wheel 22 are explained in conjunction with the rear wheel 22 as viewed in FIGS. 4 and 5.

First, the nut 56 on the rear wheel shaft 50 is slackened on a vehicle-body right side which is a main-muffler-38 side and is removed from the rear wheel shaft 50. Two bolts 53 are slackened to an extent wherein the connection between two bolts 53 and the casing 51 is maintained. Two bolts 54 are removed and, thereafter, the spacer 52 is pulled out on the vehicle-body left side which is a side opposite to the main muffler 38. The rear wheel shaft 50 penetrates the connection member 49, the casing 51, the inner member 66, the flange 65, the rear-wheel wheel 63, a bracket 55 of a rear caliper 45 and a right swing arm 21 respectively from a vehicle-body left side.

By pulling out the spacer 52 after removing the nut 56, a space is defined between the connection member 49 and the casing 51 in the axial direction of the rear wheel shaft 50. The casing 51 is then moved toward the connection member 49 side using the space. The casing cover 51a is connected to the casing 51 using bolts 66a, while the inner member 66 is supported on the casing cover 51a by way of a bearing α. The rear wheel shaft 50 penetrates the casing and the inner member 66. Thus, the casing and the inner member 66 are moved in the axial direction of the rear wheel shaft 50. Due to such an operation, the spline fitting between the inner member 66 and the flange 65 is disengaged. When the casing 51 is moved toward the connection member 49 side, a front end portion of the drive shaft 25 is joined to the transmission 18 by way of the universal joint 46, while a rear end portion of the drive shaft 25 is joined to the final drive unit 48 by way of the spherical spline 47. Thus, the drive shaft 25 can smoothly move the casing 51 in the axial direction by allowing the translational movement of the casing 51.

After the casing 51 is displaced toward the connection member 49 side from the rear-wheel wheel 63, the rear wheel shaft 50 is pulled out and is moved to the rear-wheel wheel 63 on the connection member 49 side thus removing the bracket 55 of the rear caliper 45 from the rear wheel shaft 50. Due to such an operation, a space is defined between the rear-wheel wheel 63 and the right swing arm 21 in the axial direction of the rear wheel shaft 50. Then, by making use of the space, the rear-wheel wheel 63 is moved in a sliding manner toward the right swing arm 21 side. Since the rear wheel shaft 50 penetrates the rear-wheel wheel 63, the rear-wheel wheel 63 is moved in the axial direction of the rear wheel shaft 50. Then, by pulling out and moving the rear wheel shaft 50 to the inner member 66, the rear wheel 22 is arranged in the inside of a large space defined between the final drive unit 48 which is moved to the connection member 49 side and the right swing arm 21. Thus, the rear wheel 22 can be removed from the vehicle body.

With respect to the above-mentioned rear wheel structure, since the spacer 52 is provided between the left swing arm 20 on the driving-power-transmission-device-19 side and the rear wheel 22, the spacer 52 is not provided on the side equal to the main muffler 38 which is arranged outside the right swing arm 21 on the side opposite to the driving-power-transmission-device-19 side. Due to such an arrangement of the spacer 52, a projection in the widthwise direction of the right swing arm 21 on the main-muffler-38 side is not increased. Accordingly, it is possible to ensure a predetermined angle without narrowing a banking angle by suppressing the projection quantity in the widthwise direction of the main muffler 38.

Further, in the above-mentioned rear wheel structure, the connection member 49 is connected to the left swing arm 20 and the casing 51 by crossing the spacer 52, the spacer 52 is interposed between the left swing arm 20 and the casing 51, and the notches 58a, 59a which allow the detachable mounting of the left swing arm 20 and the casing 51 in a state that the left swing arm 20 and the spacer 52 are fastened together to the casing 51 are formed. Due to such a constitution, it is possible to mount and dismount the spacer 52 while maintaining the joining between the left swing arm 20 and the casing 51. Thus, in performing the mounting and dismounting of the rear wheel 22, it is possible to perform such an operation while maintaining the casing 51 on the vehicle body whereby it is unnecessary to remove the final drive unit 48 thus enhancing the operability.

Further, in the above-mentioned rear wheel structure, the spacer 52 is guided by the guide member 61 which is formed on the swing arm 20 at the time of performing the mounting and dismounting the spacer 52. Thus, the insertion and the removal of the spacer 52 can be performed smoothly.

Further, in the above-mentioned rear wheel structure, in displacing the final drive unit 48 at the time of performing the mounting or dismounting of the rear wheel 22, the engine 17 side of the drive shaft 25 is connected by way of the universal joint 46, and the rear wheel 22 side of the drive shaft 25 is connected to the spherical spline 47. Thus, the translational movement of the final drive unit 48 in the axial direction can be easily performed.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A rear wheel structure comprising:
   left and right swing arms arranged to sandwich a rear wheel;
   a rear wheel shaft extending between the left and right swing arms;
   a driving force transmission device for transmitting a driving force to the rear wheel along one swing arm, the driving force transmission device including a final drive unit;
   a spacer arranged on an axle of the rear wheel;
   a muffler arranged outside the swing arm on a side opposite to the driving force transmission device; and
   a casing which covers the final drive unit; and
   a connection member which crosses the spacer and connects the swing arm and the casing,
   wherein the spacer is arranged between the swing arm and the casing and has a notch for enabling the detachable mounting of the spacer in a state wherein the swing arm and the spacer are fastened together to the casing by the connection member.

2. The rear wheel structure according to claim 1, wherein a guide member for guiding the spacer is integrally formed with the swing arm.

3. The rear wheel structure according to claim 2, wherein the driving force transmission device is a shaft drive device which uses a drive shaft; and
   the drive shaft mounts a universal joint on a front portion thereof and a spherical spline on a rear portion thereof.

4. The rear wheel structure according to claim 1, wherein the driving force transmission device is a shaft drive device which uses a drive shaft; and
   the drive shaft mounts a universal joint on a front portion thereof and a spherical spline on a rear portion thereof.

5. The rear wheel structure according to claim 1, wherein the rear wheel shaft fits within the notch, the notch having a height greater than a diameter of the rear wheel shaft.

6. The rear wheel structure according to claim 1, wherein the spacer has a substantially V-shaped plate shape and forms a transversely extending U-shaped shaft support portion which is fitted to the rear wheel shaft,
   wherein the spacer comprises a pair of bolt support portions in a center portion thereof, and wherein a notch corresponding to the mounting or dismounting direction of the spacer is formed in each of the bolt support portions and the shaft support portion.

7. The rear wheel structure according to claim 1, wherein the spacer has a substantially V-shaped plate shape and forms a transversely extending U-shaped shaft support portion which is fitted to the rear wheel shaft,
   wherein the spacer comprises a pair of bolt support portions in distal end portions and a pair of bolt holes in a center portion thereof, and wherein a notch corresponding to the mounting or dismounting direction of the spacer is formed in each of the bolt support portions and the shaft support portion.

8. A rear wheel structure comprising:
   left and right swing arms adapted to operatively position a rear wheel for movement relative to a frame;
   a driving force transmission device for transmitting a driving force to the rear wheel along one swing arm;
   a spacer operatively positioned relative to the one swing arm for mounting an axle of the rear wheel relative to the one swing arm, the spacer being substantially V-shaped with a U-shaped shaft support portion between two arms, each arm having a notch or aperture for securing a bolt;
   the spacer secured to the one swing arm; and
   a muffler arranged outside the swing arms on a side opposite to the driving force transmission device;
   wherein the spacer is operatively arranged on the one swing arm on the driving-force-transmission-device-side for operatively mounting the rear wheel relative to the one swing arm.

9. The rear wheel structure according to claim 8, wherein the one swing arm includes a connection member which crosses the spacer and connects the one swing arm and a casing which covers a final drive unit of the driving force transmission device.

10. The rear wheel structure according to claim 9, wherein a guide member for guiding the spacer is integrally formed with the one swing arm.

11. The rear wheel structure according to claim 9, wherein the driving force transmission device is a shaft drive device which uses a drive shaft; and
    the drive shaft mounts a universal joint on a front portion thereof and a spherical spline on a rear portion thereof.

12. The rear wheel structure according to claim 8, wherein a guide member for guiding the spacer is integrally formed with the one swing arm.

13. The rear wheel structure according to claim 12, wherein the driving force transmission device is a shaft drive device which uses a drive shaft; and
    the drive shaft mounts a universal joint on a front portion thereof and a spherical spline on a rear portion thereof.

14. The rear wheel structure according to claim 8, wherein the driving force transmission device is a shaft drive device which uses a drive shaft; and
    the drive shaft mounts a universal joint on a front portion thereof and a spherical spline on a rear portion thereof.

15. A rear wheel structure for a vehicle comprising:
    left and right swing arms mounted to a vehicle for movement and being arranged to sandwich a rear wheel therebetween;
    a driving force transmission device for transmitting a driving force to the rear wheel along one swing arm;
    a spacer mounted on said one swing arm and arranged for retaining an axle of the rear wheel relative to the one swing arm, the spacer having a notch to engage the axle of the rear wheel; and
    a muffler being arranged outside the swing arms on a side opposite to the driving force transmission device;
    wherein the spacer is arranged between the driving force transmission device and swing arm for retaining the rear wheel relative to the one swing arm.

16. The rear wheel structure for a vehicle according to claim 15, wherein the one swing arm includes a connection member which crosses the spacer and connects the one swing arm and a casing which covers a final drive unit of the driving force transmission device; and
    the spacer is arranged between the one swing arm and the casing and the notch enables the detachable mounting of the spacer in a state wherein the one swing arm and the spacer are fastened together to the casing by the connection member.

17. The rear wheel structure for a vehicle according to claim 16, wherein a guide member for guiding the spacer is integrally formed with the one swing arm.

18. The rear wheel structure for a vehicle according to claim 16, wherein the driving force transmission device is a shaft drive device which uses a drive shaft; and
    the drive shaft mounts a universal joint on a front portion thereof and a spherical spline on a rear portion thereof.

19. The rear wheel structure for a vehicle according to claim 15, wherein a guide member for guiding the spacer is integrally formed with the one swing arm.

20. The rear wheel structure for a vehicle according to claim 15, wherein the driving force transmission device is a shaft drive device which uses a drive shaft; and the drive shaft mounts a universal joint on a front portion thereof and a spherical spline on a rear portion thereof.

* * * * *